May 3, 1966 R. W. WARFIELD 3,248,925
METHOD OF DETERMINING OPTIMUM TIME AND TEMPERATURE
CONDITIONS FOR THE HARDENING OF PLASTISOLS
Filed Jan. 22, 1965

ISOTHERMAL HARDENING OF
A PLASTISOL PROPELLANT

INVENTOR
Robert W. Warfield

BY

ATTORNEY

# United States Patent Office 3,248,925
Patented May 3, 1966

3,248,925
METHOD OF DETERMINING OPTIMUM TIME AND TEMPERATURE CONDITIONS FOR THE HARDENING OF PLASTISOLS
Robert W. Warfield, Germantown, Md., assignor to the United States of America as represented by the Secretary of the Navy
Filed Jan. 22, 1965, Ser. No. 427,519
3 Claims. (Cl. 73—15)

This is a continuation-in-part of application Serial No. 148,003, filed October 26, 1961, now abandoned.

The invention described herein may be manufactured and used by or for the Government of the United States of America for governmental purposes without the payment of any royalties thereon or therefor.

The present invention relates to resistivity testing techniques and more particularly to a method for determining the rates and etxents of the reactions of plastisol systems by measurement of volume resistivity.

The recent development of plastisol propellants and explosives has presented problems in the realm of experimental testing techniques, particularly in regard to investigations into the hardening of these complex, high energy substances. It was necessary, therefore, to devise experimental techniques for such investigations.

Heretofore, there was no direct measuring technique available to determine the rate and extent of reaction of plastisol systems. Prior to this invention the lack of adequate experimental testing techniques made it necessary to estimate the rate and extent of reaction of plastisol systems by empirical methods, such as hardness or gel point measurements.

The general purpose of this invention is to provide a novel method for studying the hardening of plastisol propellants and plastisol explosives which enables one to establish satisfactory time and temperature conditions under which it may be desirable to harden these propellants and explosives. The time required to substantially complete the hardening reaction of certain propellants and explosives is temperature dependent and, in the absence of any upper temperature limit to which the propellants and explosives can be subjected without fear of explosion, the only consequence of raising the hardening temperature is that of overcooking the plastisol. However, due to the explosive nature of these plastisols, there is a definite temperature limitation imposed upon the experiments to be described herein. Therefore, in accordance with the teachings of the present invention one may desire to harden a certain plastisol in a minimum time at the maximum safe temperature or he may choose to select a longer time and a lower and safer heating temperature for the propellant hardening process.

An object of the invention is the provision of an experimental testing method for the investigation of the rate and extent of physical reactions in the hardening of plastisols.

Another object of the invention is to provide a direct measuring method for studying rate and extent of hardening of plastisol systems.

Still another object is the application of resistivity techniques to study the hardening of plastisol propellants and explosives in order to ascertain desirable time and temperature conditions for the hardening of plastisol propellants.

Other objects and many of the attendant advantages of the invention will be readily appreciated as the same becomes better understood by reference to the following detailed description when considered in conjunction with the accompanying drawings in which.

Figure 1:
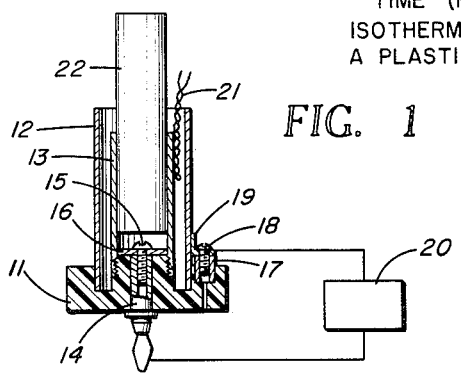
FIG. 1 is a cross-sectional elevational view of the apparatus used to measure the resistivity of the samples undergoing hardening.

Referring now to the drawings, there is shown in FIG. 1 an insulating base plate 11 having an annular recess provided with threads and having a centrally located cylindrical portion raised from the level of the annular recess which is also provided with threads.

Nickel-plated copper tube 12 is threaded externally at one end and is attached to base plate 11 (composed of polystyrene) by engagement of its threads with the internal threads of the annular recess. Nickel-plated copper tube 13, having a smaller diameter than tube 12 is threaded internally and is attached to plate 11 by engagement of its threads with the threads of the centrally located raised portion of plate 11. Tube 13 is further positioned inside the larger tube 12 so that a uniform space exists between them.

Plate 11 is further provided with two normal apertures, one positioned centrally and the other positioned near the edge of the plate.

Electric contact 14 is positioned in the central aperture and one end of the contact protrudes from the bottom of the plate. The opposite end of contact 14 is adapted to receive screw 15 which first passes through an aperture in member 16 which is connected to tube 13, so that when the screw is tightened, good electrical contact is made between contact 14 and tube 13.

Plug 17 is positioned in the aperture near the edge and is adapted to receive screw 18 which first passes through an aperture in member 19 which is connected to tube 12, so that when screw 18 is tightened, a good electrical connection is made between screw 18 and tube 12. Electrometer 20 is connected across the two electrical contacts to measure the current through the plastisol under test. Thermocouple 21 is positioned between tubes 12 and 13 to permit a continuous measurement of temperature when the space between the tubes is filled with plastisol, with the aid of glass tube 22 which is inserted in tube 13 and extending considerably above it, so as to prevent the plastisol from spilling over inside tube 13. Essentially, the apparatus is a cylindrical capacitor, the plastisol under investigation being the dielectric.

The hardening of plastisol propellants and explosives differs from that of polyfunctional polymeric-type propellants in that the hardening occurs by the progressive swelling (i.e. solvation) of finely divided nitrocellulose particles by a plasticizer to form a homogeneous, solid solution. This reaction differs from that of conventional propellant binders in that the bonds formed during the process are secondary bonds, whereas during the polymerization of conventional propellant binders primary bonds are formed.

The absence of any known chemical change during hardening of the plastisol and the presence of high concentrations of oxidizers and other additives makes chemical and infrared techniques impractical.

The mechanism for the hardening of plastisol explosives and propellants is not completely understood. It is theorized, however, that the initial reaction between nitrocellulose, which is a lyophilic colloid, and a plasticizer is the swelling (i.e. solvation) of the nitrocellulose by the plasticizer to form a gel. Gelation is considered to be the physical change which occurs until a certain degree of film strength is apparent. When heat is applied to the liquid-like sample of plasticizer and nitrocellulose, the plasticizer is absorbed into the nitrocellulose particles, diminishing the quantity of plasticizer in the liquid phase and simultaneously swelling the nitrocellulose particles, thus in two ways raising the volume concentration of the solid phase. The viscosity of a plastisol rises to an extremely high value as gelation proceeds due to this mechanism. From a fairly fluid state, the viscosity rises until the plastisol is a tacky paste in which the nitrocellulose particles are in close contact and the unabsorbed plasticizer is a discontinuous phase occluded between the agglomerated particles. At higher temperatures and with time, the remaining plasticizer is absorbed into the nitrocellulose, and the plastisol becomes dry and friable. This is usually considered to be the end point of gelation.

When continuously heated at sufficiently high temperatures, the nitrocellulose particles begin to fuse at their interfaces under the pressure of the swelling nitrocellulose particles. The loss of separate phases and interfacial boundaries cause unpigmentated plastisols to become markedly more translucent or clear. Nitrocellulose particle definition is gradually lost and tensile strength develops. With complete fusion the plasticizer and nitrocellulose form a homogeneous solution which when cooled displays a high degree of tensile strength. This course of physical change in a plastisol has been observed by all users of plastisols.

Figure 2:
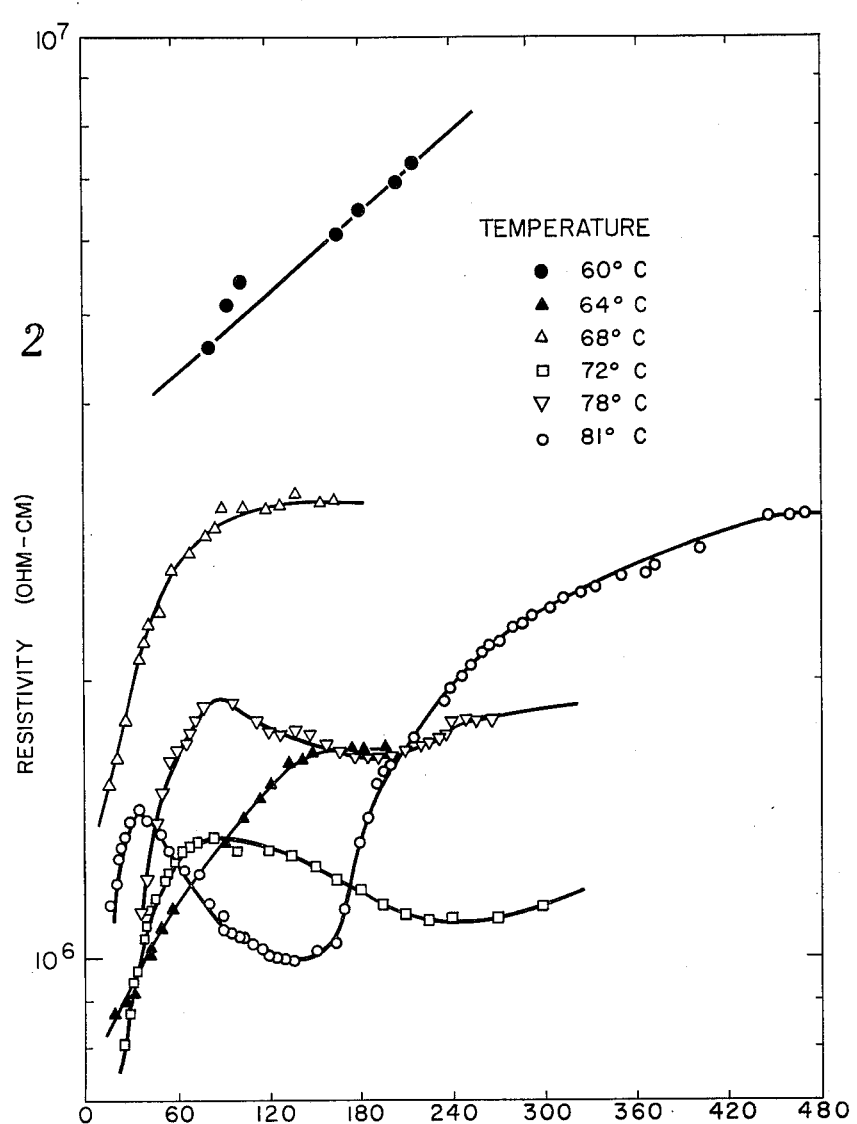
FIG. 2 is a graph showing the electrical resistivities plotted as fuctions of time for a series of isothermal reactions of the plastisol propellants.

The initial maximum points of the resistivity-time curves shown in FIG. 2 represent the gel point or the point beyond which the plastisol begins to fuse. During the initial stages of fusion there is a decrease in resistivity as the curves pass through a minimum point and thereafter the resistivity begins to increase again as the hardening reaction proceeds toward completion.

The method of the invention consists of continuously and isothermally measuring the change in the electrical volume resistivity during the hardening of the plastisol. A small sample of the particular plastisol to be studied, containing the predetermined, required amount of oxidizers and other additives is carefully mixed and poured into a small set of cylindrical electrodes. The electrodes are then attached to a continuous current monitoring device and the electrodes and plastisol sample are brought to a constant (i.e. isothermal) temperature. The change in electrical resistivity is then measured until no further change occurs. The magnitude of the resistivity will usually exhibit an overall increase as the plastisol hardens. The results are plotted semi-logarithmically versus time as shown in FIG. 2.

When the resistivity exhibits only a slight rate of change with respect to time, the hardening reaction has approached substantial completion. As shown in FIG. 2 the hardening reaction is substantially complete after 480 minutes at a temperature of 81° C. If time is of the essence in obtaining a hardened plastisol and if facilities are available to safely heat the plastisol at 81° C., then the combination of temperature and time as characterized by the 81° C. curve can be used. However, it will be observed that the 72° C. and 78° C. resistivity-time curves in FIG. 2 have been carried into their fusion stage and these temperatures may be selected as the heating temperatures where a hardening time greater than 480 minutes can be tolerated.

The plastisol of the graphs of FIG. 2, when heated at these temperatures (72° C. and 78° C.), will not complete its hardening reaction under the 480 minutes period of time required for the 81° C. temperature to cure the plastisol propellant. However, these two curves do not exhibit plastisol fusion in the manner exhibited by the 81° C. curve. In fact, the 78° C. curve exhibits an unusual leveling off in the vicinity of 240 minutes. While the plastisol, when subjected to temperatures in the vicinity of 78° C., cannot be expected to undergo substantially complete hardening prior to 480 minutes, this curve would follow the 81° C. curve closer than any of the others shown in FIG. 2. This would enable one to use a temperature in the vicinity of 78° C. which would greatly lessen the danger of explosion when compared to 81° C. heating temperature.

Comparing the 72° C. curve with the 78° C. curve it will be observed that the 78° C. curve passes through its minimum point and begins to approach a leveling off region about the same time the 72° C. curve is passing through its minimum point. This indicates that the 78° C. heated plastisol will harden in a much shorter period of time than will the plastisol cured at 72° C.

The 60° C., 64° C., and 68° C. curves all require a much longer period of time to reach their initial maximum or gel points than do the 72° C., 78° C., and 81° C. curves. Due to the excessive time required to complete the hardening reaction at these lower temperatures, experimentation was terminated after the initial nature of the hardening reaction was observed.

The particular experimental apparatus, exemplified in FIG. 1, which was used to determine the resistivity of the plastisol during hardening was the continuous current monitoring device (CCMD). This device consisted specifically of a Keithley Model 210 electrometer, a Keithley Model 2008 decade shunt and a sample cell. The sample cell, in which hardening was conducted, consisted of two small, concentric cylinders which formed an annular space holding about eight grams of sample. A small laboratory oven was used to maintain isothermal conditions within ±1° C.

In general, any plastisol comprising nitrocellulose and a plasticizer may be used in accordance with the method of the invention. The plasticizers which may form a phase of the plastisol system may include pentaerythritol trinitrate, lower aliphatic ketones such as acetone and lower alkyl nitrates such as methyl nitrate, and the like. In general any substance which will solvate the nitrocellulose to form an amphorous, homogeneous system can be considered a plasticizer in the frame of reference of plastisol systems.

Initially, the ingredients of the plastisol are mixed and thoroughly blended. The viscous liquid mixture is poured into the apparatus, shown in FIG. 1, which is then placed in a small laboratory oven where the thinness of the sample permits isothermal conditions to be maintained to within ±1° C. throughout the reaction, the temperature being continuously measured by the thermocouple. The time is measured from the first mixing of the plastisol and the resistivity is determined continuously.

EXAMPLES

The invention is illustrated, but not limited, by the following specific examples. Wherever possible, alternate modes of operation are discussed, but it will be recognized that various additional modifications can be made without deviating from the scope of the invention.

EXAMPLE I

A plastisol was prepared containing 9.5% plastisol grade cellulose nitrate, 28.8% pentaerythritol trinitrate (as plasticizer) and 61.7% oxidizers and other additives which are inert with respect to the hardening reaction.

The continuous current monitoring device (CCMD) was used to determine the electrical resistivity of the plastisol during hardening.

Eight grams of the above plastisol were carefully mixed and poured into the sample cell consisting of a small set of cylindrical electrodes as shown in FIG. 1. The electrodes were then attached to the continuous current monitoring device and the loaded sample cell was then placed in a small laboratory oven wherein isothermal conditions (±1° C.) were maintained at 60° C.

The data obtained are set forth as follows:

TABLE I

Hardening of Nitrosol Propellant at 60° C. (±1°)
Battery Voltage=3
Cell Constant=45

| Time (Minutes) | Current (Amperes) | Resistance (Ohms) | Resistivity |
|---|---|---|---|
| 80 | $1.48 \times 10^{-5}$ | $1.03 \times 10^5$ | $4.62 \times 10^6$ |
| 94 | $1.40 \times 10^{-5}$ | $1.14 \times 10^5$ | $5.14 \times 10^6$ |
| 104 | $1.36 \times 10^{-5}$ | $1.20 \times 10^5$ | $5.43 \times 10^6$ |
| 115 | $1.35 \times 10^{-5}$ | $1.22 \times 10^5$ | $5.49 \times 10^6$ |
| 148 | $1.35 \times 10^{-5}$ | $1.22 \times 10^5$ | $5.49 \times 10^6$ |
| 166 | $1.28 \times 10^{-5}$ | $1.30 \times 10^5$ | $6.08 \times 10^6$ |
| 180 | $1.23 \times 10^{-5}$ | $1.44 \times 10^5$ | $6.48 \times 10^6$ |
| 205 | $1.18 \times 10^{-5}$ | $1.54 \times 10^5$ | $6.94 \times 10^6$ |
| 255 | $1.15 \times 10^{-5}$ | $1.61 \times 10^5$ | $7.25 \times 10^6$ |

This example shows that reactions conducted at too low a temperature yield plots which lack definition. For example, in FIG. 2 it can be seen that the reaction proceeded in an irregular manner while the plots of Examples II through VI, which were conducted at higher temperatures, proceeded in a more rapid and uniform manner.

EXAMPLE II

The procedure of Example I was followed except that the temperature was raised to 64° C.

The data obtained are set forth as follows:

TABLE II

Hardening of Nitrosol Propellant at 64° C. (±1°)
Battery Voltage=3
Cell Constant=45

| Time (Minutes) | Current (Amperes) | Resistance (Ohms) | Resistivity |
|---|---|---|---|
| 20 | $2.19 \times 10^{-3}$ | $1.95 \times 10^4$ | $8.78 \times 10^5$ |
| 26 | $2.15 \times 10^{-3}$ | $1.99 \times 10^4$ | $8.96 \times 10^5$ |
| 29 | $2.10 \times 10^{-3}$ | $2.04 \times 10^4$ | $9.20 \times 10^5$ |
| 33 | $2.03 \times 10^{-3}$ | $2.12 \times 10^4$ | $9.53 \times 10^5$ |
| 38 | $1.97 \times 10^{-3}$ | $2.19 \times 10^4$ | $9.83 \times 10^5$ |
| 42 | $1.90 \times 10^{-3}$ | $2.27 \times 10^4$ | $1.02 \times 10^6$ |
| 50 | $1.80 \times 10^{-3}$ | $2.40 \times 10^4$ | $1.08 \times 10^6$ |
| 59 | $1.72 \times 10^{-3}$ | $2.51 \times 10^4$ | $1.13 \times 10^6$ |
| 92 | $1.46 \times 10^{-3}$ | $2.96 \times 10^4$ | $1.34 \times 10^6$ |
| 104 | $1.38 \times 10^{-3}$ | $3.16 \times 10^4$ | $1.42 \times 10^6$ |
| 115 | $1.32 \times 10^{-3}$ | $3.31 \times 10^4$ | $1.49 \times 10^6$ |
| 122 | $1.26 \times 10^{-3}$ | $3.47 \times 10^4$ | $1.56 \times 10^6$ |
| 134 | $1.21 \times 10^{-3}$ | $3.62 \times 10^4$ | $1.63 \times 10^6$ |
| 142 | $1.20 \times 10^{-3}$ | $3.65 \times 10^4$ | $1.64 \times 10^6$ |
| 149 | $1.17 \times 10^{-3}$ | $3.74 \times 10^4$ | $1.69 \times 10^6$ |
| 174 | $1.17 \times 10^{-3}$ | $3.74 \times 10^4$ | $1.69 \times 10^6$ |
| 182 | $1.17 \times 10^{-3}$ | $3.74 \times 10^4$ | $1.69 \times 10^6$ |
| 195 | $1.17 \times 10^{-3}$ | $3.74 \times 10^4$ | $1.69 \times 10^6$ |

EXAMPLE III

The procedure of Example I was followed except that the temperature was raised to 68° C.

The data obtained are set forth as follows:

TABLE III

Hardening of Nitrosol Propellant at 68° C. (±1°)
Battery Voltage=45
Cell Constant=86

| Time (Minutes) | Current (Amperes) | Resistance (Ohms) | Resistivity |
|---|---|---|---|
| 16 | $2.38 \times 10^{-3}$ | $1.79 \times 10^4$ | $1.54 \times 10^6$ |
| 20 | $2.22 \times 10^{-3}$ | $1.93 \times 10^4$ | $1.66 \times 10^6$ |
| 26 | $2.04 \times 10^{-3}$ | $2.10 \times 10^4$ | $1.81 \times 10^6$ |
| 37 | $1.75 \times 10^{-3}$ | $2.47 \times 10^4$ | $2.12 \times 10^6$ |
| 40 | $1.68 \times 10^{-3}$ | $2.58 \times 10^4$ | $2.22 \times 10^6$ |
| 42 | $1.61 \times 10^{-3}$ | $2.69 \times 10^4$ | $2.31 \times 10^6$ |
| 48 | $1.56 \times 10^{-3}$ | $2.78 \times 10^4$ | $2.39 \times 10^6$ |
| 57 | $1.42 \times 10^{-3}$ | $3.07 \times 10^4$ | $2.64 \times 10^6$ |
| 69 | $1.36 \times 10^{-3}$ | $3.21 \times 10^4$ | $2.76 \times 10^6$ |
| 80 | $1.30 \times 10^{-3}$ | $3.36 \times 10^4$ | $2.89 \times 10^6$ |
| 85 | $1.28 \times 10^{-3}$ | $3.42 \times 10^4$ | $2.94 \times 10^6$ |
| 90 | $1.22 \times 10^{-3}$ | $3.59 \times 10^4$ | $3.09 \times 10^6$ |
| 103 | $1.22 \times 10^{-3}$ | $3.59 \times 10^4$ | $3.09 \times 10^6$ |
| 120 | $1.22 \times 10^{-3}$ | $3.59 \times 10^4$ | $3.09 \times 10^6$ |
| 127 | $1.21 \times 10^{-3}$ | $3.62 \times 10^4$ | $3.11 \times 10^6$ |
| 138 | $1.20 \times 10^{-3}$ | $3.65 \times 10^4$ | $3.14 \times 10^6$ |
| 153 | $1.20 \times 10^{-3}$ | $3.65 \times 10^4$ | $3.14 \times 10^6$ |
| 161 | $1.20 \times 10^{-3}$ | $3.65 \times 10^4$ | $3.14 \times 10^6$ |

EXAMPLE IV

The procedure of Example I was followed except that the temperature was raised to 72° C.

The data obtained are set forth as follows:

TABLE IV

Hardening of Nitrosol Propellant at 72° C. (±1°)
Battery Voltage=45
Cell Constant=45

| Time (Minutes) | Current (Amperes) | Resistance (Ohms) | Resistivity |
|---|---|---|---|
| 34 | $2.00 \times 10^{-3}$ | $2.15 \times 10^4$ | $9.68 \times 10^5$ |
| 38 | $1.84 \times 10^{-3}$ | $2.34 \times 10^4$ | $1.05 \times 10^6$ |
| 41 | $1.80 \times 10^{-3}$ | $2.40 \times 10^4$ | $1.08 \times 10^6$ |
| 44 | $1.73 \times 10^{-3}$ | $2.50 \times 10^4$ | $1.13 \times 10^6$ |
| 47 | $1.68 \times 10^{-3}$ | $2.58 \times 10^4$ | $1.16 \times 10^6$ |
| 53 | $1.60 \times 10^{-3}$ | $2.71 \times 10^4$ | $1.22 \times 10^6$ |
| 55 | $1.58 \times 10^{-3}$ | $2.74 \times 10^4$ | $1.24 \times 10^6$ |
| 60 | $1.54 \times 10^{-3}$ | $2.82 \times 10^4$ | $1.27 \times 10^6$ |
| 63 | $1.50 \times 10^{-3}$ | $2.90 \times 10^4$ | $1.31 \times 10^6$ |
| 68 | $1.48 \times 10^{-3}$ | $2.94 \times 10^4$ | $1.32 \times 10^6$ |
| 73 | $1.46 \times 10^{-3}$ | $2.99 \times 10^4$ | $1.34 \times 10^6$ |
| 85 | $1.44 \times 10^{-3}$ | $3.03 \times 10^4$ | $1.36 \times 10^6$ |
| 100 | $1.48 \times 10^{-3}$ | $2.94 \times 10^4$ | $1.32 \times 10^6$ |
| 120 | $1.48 \times 10^{-3}$ | $2.94 \times 10^4$ | $1.32 \times 10^6$ |
| 135 | $1.52 \times 10^{-3}$ | $2.92 \times 10^4$ | $1.29 \times 10^6$ |
| 150 | $1.55 \times 10^{-3}$ | $2.82 \times 10^4$ | $1.26 \times 10^6$ |
| 165 | $1.60 \times 10^{-3}$ | $2.72 \times 10^4$ | $1.22 \times 10^6$ |
| 180 | $1.65 \times 10^{-3}$ | $2.63 \times 10^4$ | $1.18 \times 10^6$ |
| 195 | $1.71 \times 10^{-3}$ | $2.54 \times 10^4$ | $1.14 \times 10^6$ |
| 210 | $1.75 \times 10^{-3}$ | $2.47 \times 10^4$ | $1.11 \times 10^6$ |
| 225 | $1.77 \times 10^{-3}$ | $2.46 \times 10^4$ | $1.10 \times 10^6$ |
| 240 | $1.77 \times 10^{-3}$ | $2.46 \times 10^4$ | $1.10 \times 10^6$ |
| 270 | $1.77 \times 10^{-3}$ | $2.46 \times 10^4$ | $1.10 \times 10^6$ |
| 300 | $1.72 \times 10^{-3}$ | $2.52 \times 10^4$ | $1.13 \times 10^6$ |

EXAMPLE V

The procedure of Example I was followed except that the temperature was raised to 72° C.

The data obtained are set forth as follows:

TABLE V

Hardening of Nitrosol Propellant at 78° C. (±1°)
Battery Voltage=3
Cell Constant=45

| Time (Minutes) | Current (Amperes) | Resistance (Ohms) | Resistivity |
|---|---|---|---|
| 38 | $1.68 \times 10^{-3}$ | $2.58 \times 10^4$ | $1.16 \times 10^6$ |
| 41 | $1.59 \times 10^{-3}$ | $2.72 \times 10^4$ | $1.22 \times 10^6$ |
| 46 | $1.39 \times 10^{-3}$ | $3.14 \times 10^4$ | $1.41 \times 10^6$ |
| 51 | $1.30 \times 10^{-3}$ | $3.37 \times 10^4$ | $1.52 \times 10^6$ |
| 56 | $1.20 \times 10^{-3}$ | $3.65 \times 10^4$ | $1.64 \times 10^6$ |
| 62 | $1.18 \times 10^{-3}$ | $3.71 \times 10^4$ | $1.67 \times 10^6$ |
| 66 | $1.16 \times 10^{-3}$ | $3.77 \times 10^4$ | $1.70 \times 10^6$ |
| 70 | $1.12 \times 10^{-3}$ | $3.91 \times 10^4$ | $1.76 \times 10^6$ |
| 83 | $1.09 \times 10^{-3}$ | $4.02 \times 10^4$ | $1.81 \times 10^6$ |
| 88 | $1.05 \times 10^{-3}$ | $4.17 \times 10^4$ | $1.88 \times 10^6$ |
| 99 | $1.05 \times 10^{-3}$ | $4.17 \times 10^4$ | $1.88 \times 10^6$ |
| 113 | $1.10 \times 10^{-3}$ | $3.99 \times 10^4$ | $1.80 \times 10^6$ |
| 118 | $1.12 \times 10^{-3}$ | $3.92 \times 10^4$ | $1.76 \times 10^6$ |
| 127 | $1.12 \times 10^{-3}$ | $3.92 \times 10^4$ | $1.76 \times 10^6$ |
| 137 | $1.12 \times 10^{-3}$ | $3.92 \times 10^4$ | $1.76 \times 10^6$ |
| 147 | $1.13 \times 10^{-3}$ | $3.88 \times 10^4$ | $1.75 \times 10^6$ |
| 157 | $1.15 \times 10^{-3}$ | $3.81 \times 10^4$ | $1.71 \times 10^6$ |
| 167 | $1.18 \times 10^{-3}$ | $3.71 \times 10^4$ | $1.67 \times 10^6$ |
| 172 | $1.20 \times 10^{-3}$ | $3.65 \times 10^4$ | $1.64 \times 10^6$ |
| 180 | $1.20 \times 10^{-3}$ | $3.65 \times 10^4$ | $1.64 \times 10^6$ |
| 185 | $1.20 \times 10^{-3}$ | $3.65 \times 10^4$ | $1.64 \times 10^6$ |
| 192 | $1.20 \times 10^{-3}$ | $3.65 \times 10^4$ | $1.64 \times 10^6$ |
| 200 | $1.18 \times 10^{-3}$ | $3.71 \times 10^4$ | $1.67 \times 10^6$ |
| 205 | $1.18 \times 10^{-3}$ | $3.71 \times 10^4$ | $1.67 \times 10^6$ |
| 210 | $1.17 \times 10^{-3}$ | $3.74 \times 10^4$ | $1.68 \times 10^6$ |
| 215 | $1.16 \times 10^{-3}$ | $3.78 \times 10^4$ | $1.70 \times 10^6$ |
| 220 | $1.15 \times 10^{-3}$ | $3.81 \times 10^4$ | $1.71 \times 10^6$ |
| 225 | $1.15 \times 10^{-3}$ | $3.81 \times 10^4$ | $1.71 \times 10^6$ |
| 230 | $1.14 \times 10^{-3}$ | $3.84 \times 10^4$ | $1.73 \times 10^6$ |
| 235 | $1.13 \times 10^{-3}$ | $3.88 \times 10^4$ | $1.75 \times 10^6$ |
| 240 | $1.11 \times 10^{-3}$ | $3.95 \times 10^4$ | $1.78 \times 10^6$ |
| 245 | $1.10 \times 10^{-3}$ | $3.99 \times 10^4$ | $1.80 \times 10^6$ |
| 250 | $1.10 \times 10^{-3}$ | $3.99 \times 10^4$ | $1.80 \times 10^6$ |
| 255 | $1.09 \times 10^{-3}$ | $4.02 \times 10^4$ | $1.81 \times 10^6$ |
| 260 | $1.07 \times 10^{-3}$ | $4.10 \times 10^4$ | $1.85 \times 10^6$ |
| 265 | $1.06 \times 10^{-3}$ | $4.14 \times 10^4$ | $1.86 \times 10^6$ |

EXAMPLE VI

The procedure of Example I was followed except the temperature was raised to 81° C.

The data obtained are set forth as follows:

TABLE VI

Hardening of Nitrosol Propellant at 81° C. (±1°)
Battery Voltage=3
Cell Constant=45

| Time (Minutes) | Current (Amperes) | Resistance (Ohms) | Resistivity |
|---|---|---|---|
| 36 | 1.36×10⁻³ | 3.21×10⁴ | 1.45×10⁶ |
| 40 | 1.40×10⁻³ | 3.12×10⁴ | 1.40×10⁶ |
| 46 | 1.41×10⁻³ | 3.10×10⁴ | 1.40×10⁶ |
| 50 | 1.44×10⁻³ | 3.03×10⁴ | 1.36×10⁶ |
| 55 | 1.50×10⁻³ | 2.90×10⁴ | 1.31×10⁶ |
| 65 | 1.57×10⁻³ | 2.76×10⁴ | 1.24×10⁶ |
| 75 | 1.65×10⁻³ | 2.62×10⁴ | 1.18×10⁶ |
| 80 | 1.71×10⁻³ | 2.53×10⁴ | 1.14×10⁶ |
| 87 | 1.76×10⁻³ | 2.46×10⁴ | 1.11×10⁶ |
| 90 | 1.80×10⁻³ | 2.40×10⁴ | 1.08×10⁶ |
| 95 | 1.82×10⁻³ | 2.37×10⁴ | 1.07×10⁶ |
| 100 | 1.84×10⁻³ | 2.34×10⁴ | 1.05×10⁶ |
| 105 | 1.86×10⁻³ | 2.32×10⁴ | 1.04×10⁶ |
| 110 | 1.88×10⁻³ | 2.29×10⁴ | 1.03×10⁶ |
| 115 | 1.90×10⁻³ | 2.27×10⁴ | 1.02×10⁶ |
| 120 | 1.92×10⁻³ | 2.24×10⁴ | 1.01×10⁶ |
| 125 | 1.94×10⁻³ | 2.22×10⁴ | 1.00×10⁶ |
| 130 | 1.95×10⁻³ | 2.21×10⁴ | 9.94×10⁵ |
| 135 | 1.95×10⁻³ | 2.21×10⁴ | 9.94×10⁵ |
| 150 | 1.90×10⁻³ | 2.27×10⁴ | 1.02×10⁶ |
| 190 | 1.28×10⁻³ | 3.42×10⁴ | 1.54×10⁶ |
| 195 | 1.24×10⁻³ | 3.53×10⁴ | 1.59×10⁶ |
| 200 | 1.22×10⁻³ | 3.57×10⁴ | 1.62×10⁶ |
| 205 | 1.20×10⁻³ | 3.65×10⁴ | 1.65×10⁶ |
| 215 | 1.14×10⁻³ | 3.85×10⁴ | 1.73×10⁶ |
| 235 | 1.04×10⁻³ | 4.22×10⁴ | 1.90×10⁶ |
| 240 | 1.01×10⁻³ | 4.35×10⁴ | 1.96×10⁶ |
| 246 | 9.80×10⁻⁴ | 4.50×10⁴ | 2.02×10⁶ |
| 252 | 9.60×10⁻⁴ | 4.60×10⁴ | 2.07×10⁶ |
| 258 | 9.30×10⁻⁴ | 4.75×10⁴ | 2.14×10⁶ |
| 264 | 9.10×10⁻⁴ | 4.85×10⁴ | 2.18×10⁶ |
| 270 | 9.00×10⁻⁴ | 4.90×10⁴ | 2.20×10⁶ |
| 279 | 8.70×10⁻⁴ | 5.08×10⁴ | 2.28×10⁶ |
| 285 | 8.60×10⁻⁴ | 5.14×10⁴ | 2.31×10⁶ |
| 291 | 8.50×10⁻⁴ | 5.20×10⁴ | 2.34×10⁶ |
| 303 | 8.30×10⁻⁴ | 5.33×10⁴ | 2.39×10⁶ |
| 312 | 8.10×10⁻⁴ | 5.45×10⁴ | 2.45×10⁶ |
| 321 | 8.00×10⁻⁴ | 5.53×10⁴ | 2.48×10⁶ |
| 333 | 7.90×10⁻⁴ | 5.60×10⁴ | 2.52×10⁶ |
| 350 | 7.70×10⁻⁴ | 5.75×10⁴ | 2.59×10⁶ |
| 366 | 7.60×10⁻⁴ | 5.82×10⁴ | 2.62×10⁶ |
| 372 | 7.50×10⁻⁴ | 5.90×10⁴ | 2.66×10⁶ |
| 400 | 7.20×10⁻⁴ | 6.15×10⁴ | 2.77×10⁶ |
| 410 | 6.90×10⁻⁴ | 6.41×10⁴ | 2.88×10⁶ |
| 420 | 6.50×10⁻⁴ | 6.82×10⁴ | 3.07×10⁶ |
| 430 | 6.50×10⁻⁴ | 6.82×10⁴ | 3.07×10⁶ |
| 445 | 6.60×10⁻⁴ | 6.71×10⁴ | 3.07×10⁶ |
| 450 | 6.60×10⁻⁴ | 6.71×10⁴ | 3.07×10⁶ |
| 460 | 6.60×10⁻⁴ | 6.71×10⁴ | 3.07×10⁶ |

The resistance (in ohms) is determined by the following formula:

$$\text{Resistance} = \frac{(E_B - E_m)}{I}$$

where $E_B$ is the battery voltage, $E_m$ is the voltage read on the electrometer, $(E_B - E_m)$ is the potential drop across the plastisol and $I$ is the current.

The resistivity is determined by the following formula:

$$\text{Resistivity} = R \times k$$

where $R$ is the resistance and $k$ is the cell constant.

The resistivity of a sample may be determined in several ways. The resistance of the sample may be determined directly with an ohmmeter connected across the sample, or the current through the sample may be measured along with the voltage drop across it and resistance calculated from Ohm's law. The resistance of the sample multiplied by the geometric factor $A/L$ gives the resistivity, where $A$ is the surface area of the sample perpendicular to the potential gradient and $L$ is the current path length of the sample.

Alternatively, a cell may be made where $A$ is one square centimeter and $L$ is one centimeter, in which case the resistivity and the resistance are numerically equal.

A cylindrical cell is not necessary as any cell comprising a capacitor with the plastisol dielectric between the plates would be satisfactory. The dielectric should be thin, however, so that isothermal conditions may be easily maintained.

Any voltage, preferably from 3 to 45 volts, may be used in the measurement of resistivity although care should be taken with voltages higher than 45 volts to avoid violent decomposition of the sample.

The data of Examples I to VI are summarized in FIG. 2. The curves show the changes which occur in the magnitude of the resistivity and exhibit the course of the hardening reaction at various temperatures.

As clearly shown by the curves, the hardening reaction undergoes two phases, the initial phase being one of gelation and is evidenced by the rapid increase in resistivity to an initial maximum value. For example, in FIG. 2, the reaction at 81° C. exhibits an initial maximum resistivity (gel point) after about 40 minutes. After the initial phase, the secondary phase is manifested by the further interaction of the swollen nitrocellulose particles with excess plasticizer to form a viscous, homogeneous solution of the particles in the plasticizer. This is evidenced by a decrease in the resistivity as the swollen particles dissolve in the plasticizer. Following this decrease, however, there is an increase in the resistivity as solvation approaches completion. Completion of the reaction is indicated by the leveling off of the resistivity toward a constant value after 480 minutes.

The usefulness and value of the measurements are not impaired by the presence of high concentrations of materials which are necessary for the performance of the plastisol as a propellant or explosive. These materials are inert insofar as the hardening reaction is concerned.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A method for determining optimum time and temperature for hardening plastisol explosives which comprises:
   (a) isothermally heating at different temperatures a series of samples of the plastisol,
   (b) measuring the resistivity of the samples at intervals of time during said heating, continuing said measuring so that a plot of the isothermal relationship between the logarithm of resistivity and time for the plastisol will pass through a maximum, a minimum and then level off,
   (c) plotting from said measurements the isothermal relationship between the logarithm of resistivity and time for the plastisol, and
   (d) continuing said plotting until there are sufficient points so that a curve drawn through said points for each isotherm passes through a maximum and a minimum and then levels off, the leveling portion of said curve representing the time at which the plastisol hardens at said temperature.

2. The method of claim 1 wherein the heating temperatures employed range between 60° C. and 81° C.

3. The method of claim 1 wherein the plastisol comprises nitrocellulose and a plasticizer.

References Cited by the Examiner

UNITED STATES PATENTS 3,049,410   8/1962   Warfield et al. _____ 73—17 X

RICHARD C. QUEISSER, *Primary Examiner.*

J. C. GOLDSTEIN, *Assistant Examiner.*